United States Patent
Hoke et al.

(10) Patent No.: US 7,625,275 B1
(45) Date of Patent: Dec. 1, 2009

(54) AERODYNAMIC RAIN-HAT FOR VEHICLE AIR INTAKE

(75) Inventors: Paul Hoke, Plymouth, MI (US); Christopher Greiner, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/340,358

(22) Filed: Jan. 26, 2006

(51) Int. Cl.
*B60H 1/30* (2006.01)
(52) U.S. Cl. .......................................... 454/147; 454/69
(58) Field of Classification Search .................... 454/69, 454/158, 89, 184; 55/323
See application file for complete search history.

(56) References Cited

U.S. PATENT DOCUMENTS

| | | | |
|---|---|---|---|
| 5,145,457 A | 9/1992 | Tanigaito | 454/147 |
| 5,350,444 A * | 9/1994 | Gould et al. | 96/154 |
| 5,722,884 A * | 3/1998 | Komowski | 454/69 |
| 6,033,300 A | 3/2000 | Schneider | 454/147 |
| 6,364,009 B1 * | 4/2002 | MacManus et al. | 165/185 |
| RE38,157 E | 6/2003 | Schneider | 454/147 |
| 6,692,347 B1 * | 2/2004 | Schneider | 454/158 |
| 7,090,710 B2 * | 8/2006 | Choi | 55/385.3 |
| 2004/0185767 A1 | 9/2004 | Schneider | 454/158 |
| 2005/0003752 A1 | 1/2005 | Lewis | 454/147 |
| 2005/0059338 A1 | 3/2005 | Wijaya | 454/151 |
| 2005/0095974 A1 | 5/2005 | Wijaya | 454/151 |

* cited by examiner

*Primary Examiner*—Steven B McAllister
*Assistant Examiner*—Samantha A Miller
(74) *Attorney, Agent, or Firm*—Gregory Brown; Miller Law Group, PLLC

(57) ABSTRACT

A rain-hat is mounted over the fresh air intake opening of an automotive vehicle to restrict the passage of free water into the fresh air intake opening. The rain-hat is formed with a sloped front wall have the top edge leading into the direction of air flow from the air intake cowling toward the fresh air inlet opening. The front wall can be formed in a linear configuration or in a curvilinear configuration to reduce the separation bubble commonly associated with the passage of air over the raised leading edge of the rain-hat. The smooth flow of fresh air into the intake opening reduces the power requirements of the heating, ventilation and air conditioning system for which the vehicle which draws the air into the intake opening. The reduction of the separated flow region also results in a reduction in vehicle noise during the operation of the vehicle.

7 Claims, 6 Drawing Sheets

AERODYNAMIC RAIN-HAT FOR VEHICLE AIR INTAKE

FIELD OF THE INVENTION

This invention relates to the air intake on automotive vehicles and, more particularly, to an aerodynamic rain-hat mounted at the air intake opening to reduce power required to draw air into the ventilation system for the vehicle.

BACKGROUND OF THE INVENTION

Conventionally, automotive vehicles have a fresh air inlet at the cowling located between the hood and the windshield of the vehicle. The cowling is provided with a screen to keep debris out of the fresh air intake inlet, which is typically located along the side of the windshield on the passenger side of the vehicle. Conventional design of the fresh air inlet places a rain-hat on the inlet opening to restrict the flow of moisture, such as rainwater, into the inlet opening. The conventional rain-hat is simply formed with an upright wall that raises the inlet opening above the level of the channel along the cowling beneath the leaf screen. The raised inlet opening formed by the rain-hat allows for air to flow into the opening, while rainwater flows along the channel around the rain-hat for discharge externally of the vehicle without flowing into the air inlet opening.

The heating, ventilation and air conditioning system (HVAC system) for an automotive vehicle is subjected to a pressure loss due to the aerodynamic choking of the cowl fresh air flow as the intake air separates and creates a recirculation zone due to changing direction of movement while passing over the edge of the rain-hat structure. The increased pressure loss results in a corresponding increase in system noise and causes an uneven loading of the HVAC scroll blower motor wheel. The increased pressure loss also causes more power to be utilized by the HVAC system to overcome the increased HVAC system pressure drop, resulting in electrical charge and fuel economy issues for the vehicle. Filters and other obstruction structure can also be used to separate water from the air intake, but such devices also result in an increased HVAC pressure drop.

Another approach to resolving the increased pressure drop at the fresh air intake opening is to form the rain-hat structure to be larger than the actual opening into the HVAC system. While the flow separation resulting from the inlet of air over the raised rain-hat vertical surface still exists in this enlarged rain-hat structure, the flow separation has a reduced effect on the inflow of fresh air into the inlet opening for the HVAC system beneath the rain-hat; however, some increased pressure loss remains, requiring additional power to operate the HVAC system.

An example of a rain-hat can be found in U.S. Reissue Pat. No. RE38,157, issued to Dean Schneider on Jun. 24, 2003. In Schneider, the rain-hat has first and second supports perpendicular to each other. The draw of the rain-hat is generally parallel to the direction of the airflow. The Schneider rain-hat has a rain dam knife-edge with tapered exterior side edges to improve airflow and reduce air friction U.S. Pat. No. 6,033,300 granted to Dean Schneider on Mar. 7, 2000, discloses a similar rain-hat similar to that of the Schneider patent for use in conjunction with an air intake opening.

U.S. Pat. No. 5,145,457, issued to Yasushi Tanigaito on Sep. 8, 1992, discloses a conventional rain-hat configuration in which the vertical rectangular walls serve as a water stopper to prevent the entry of free water into the air intake. U.S. Patent Application Publication Document No. 2004/0185767 of Dean Schneider, dated Sep. 23, 2004, teaches an example of a filter housing that prevents the entrance of unwanted materials, such as debris and water, into the vehicle air intake. U.S. Patent Application Publication Document No. 2005/0003752 of Keith Lewis, et al, dated Jan. 6, 2005, teach a shield and a deflector for preventing the inflow of debris and water into the HVAC system of an automobile. U.S. Patent Application Publication Document Nos. 2005/0059338 and 2005/0095974 of Lim Wijaya, dated Mar. 17, 2005, and May 5, 2005, respectively, provide a fresh air intake for a rear window of a vehicle.

Accordingly, it would be desirable to provide a rain-hat configuration that will reduce power requirement for the heating, ventilation and air conditioning system for an automotive vehicle by reducing the pressure drop associated with the passage of air over the upright wall of the rain-hat structure.

SUMMARY OF THE INVENTION

It is an object of this invention to overcome the aforementioned disadvantages of the known prior art by providing a rain-hat for the air intake opening of an automotive vehicle that reduces the pressure drop associated with the passage of air over the upright wall of the rain-hat structure.

It is a feature of this invention that the rain-hat is provided with a sloped front that provides a streamlined flow pattern into the air intake opening for the heating, ventilation and air conditioning system.

It is another feature of this invention that the sloped front wall can be formed in a curvilinear configuration to minimize the creation of a separated flow region in the incoming air stream over the top edge of the rain-hat structure.

It is an advantage of this invention that the flow of air into the HVAC fresh air inlet opening follows a smooth flow path along the front wall of the rain-hat structure.

It is another advantage of this invention that the rain-hat structure with a sloped front wall configuration reduces the pressure drop associated with the intake of air over a rain-hat structure.

It is still another feature of this invention that the front wall can be formed in a linear configuration with the front edge being positioned in a leading relationship with respect to the air intake opening.

It is still another advantage of this invention that the reduced air pressure drop results in a corresponding reduction in the power requirements for the HVAC system to draw fresh air into the system.

It is yet another advantage of this invention that the reduction in power requirements results in an improvement in fuel economy for the vehicle.

It is a further object of this invention to provide a rain-hat configuration for use with a fresh air intake of a vehicle HVAC system that is durable in construction, inexpensive of manufacture, carefree of maintenance, facile in assemblage, and simple and effective in use.

These and other objects, features and advantages are accomplished according to the instant invention by providing a rain-hat mounted over the fresh air intake opening of an automotive vehicle to restrict the passage of free water into the fresh air intake opening. The rain-hat is formed with a sloped front wall have the top edge leading into the direction of air flow from the air intake cowling toward the fresh air inlet opening. The front wall can be formed in a linear configuration or in a curvilinear configuration to reduce the separation bubble commonly associated with the passage of air over the raised leading edge of the rain-hat. The smooth flow of fresh air into the intake opening reduces the power requirements of the heating, ventilation and air conditioning system for which the vehicle which draws the air into the intake opening. The reduction of the separated flow region also results in a reduction in vehicle noise during the operation of the vehicle.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
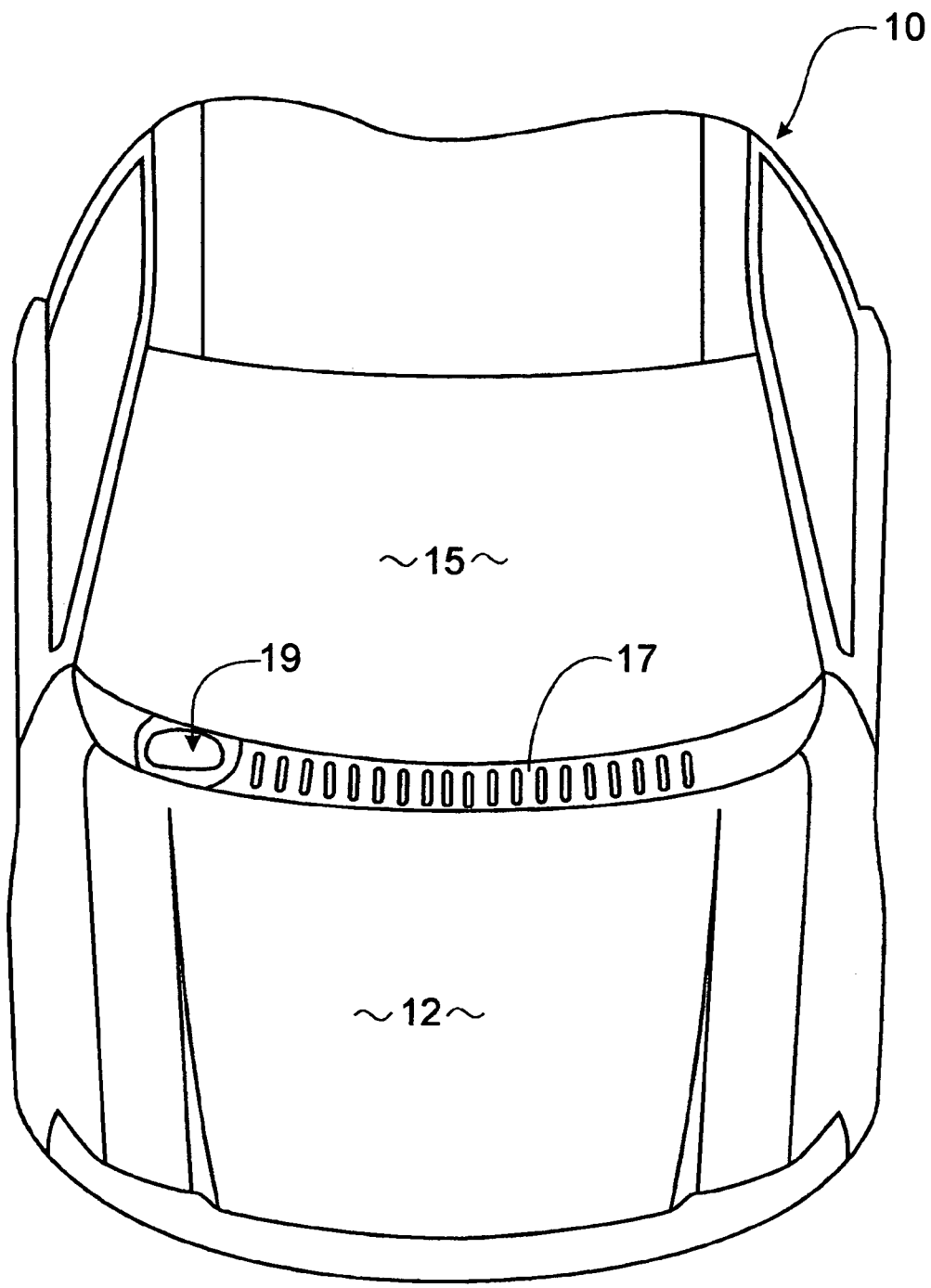
FIG. 1 is a partial schematic top plan view of an automotive vehicle on which a rain-hat incorporating the principles of the instant invention can be used.
Figure 2:
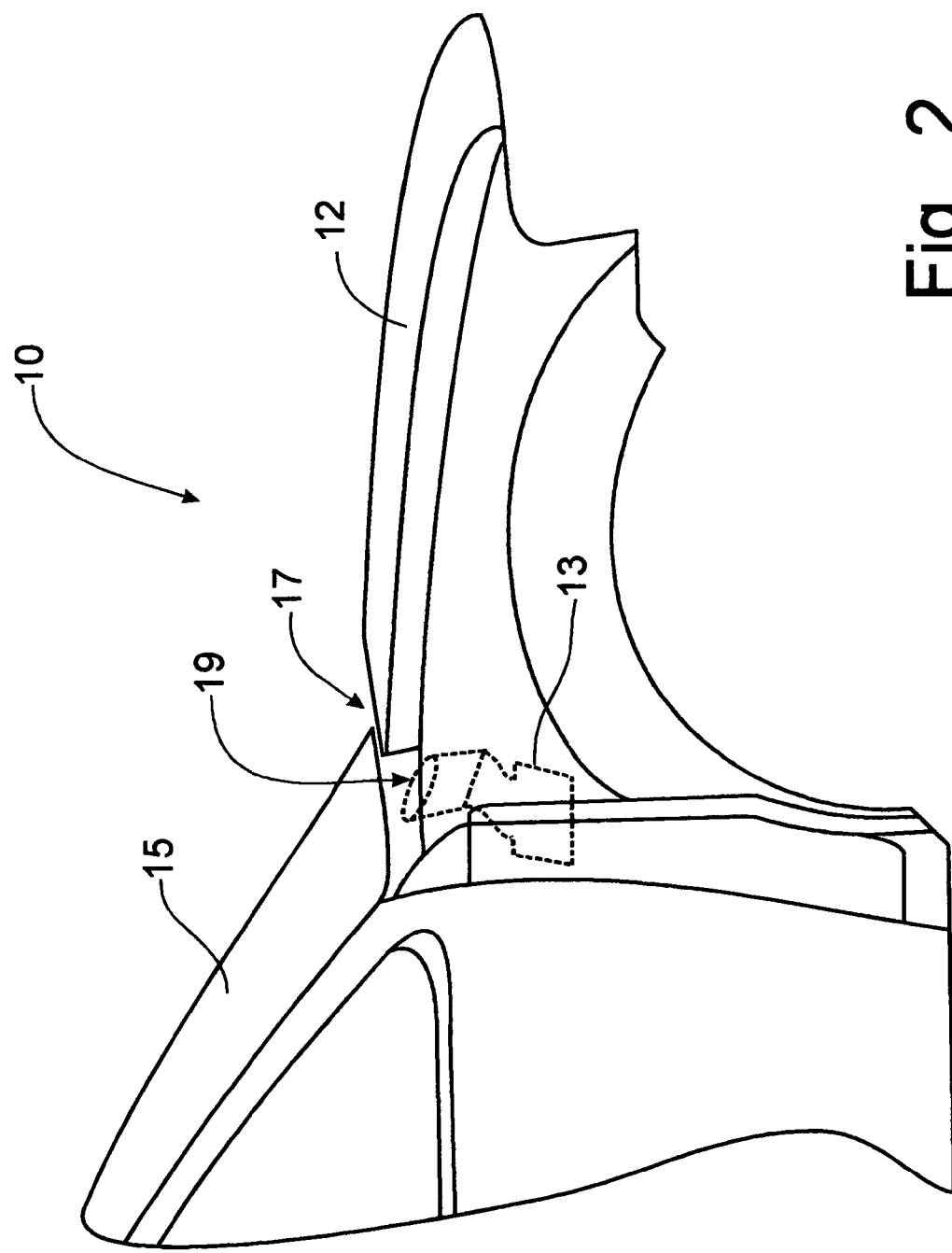
FIG. 2 is a partial schematic side elevational view of the vehicle depicted in FIG. 1.
Figure 3:
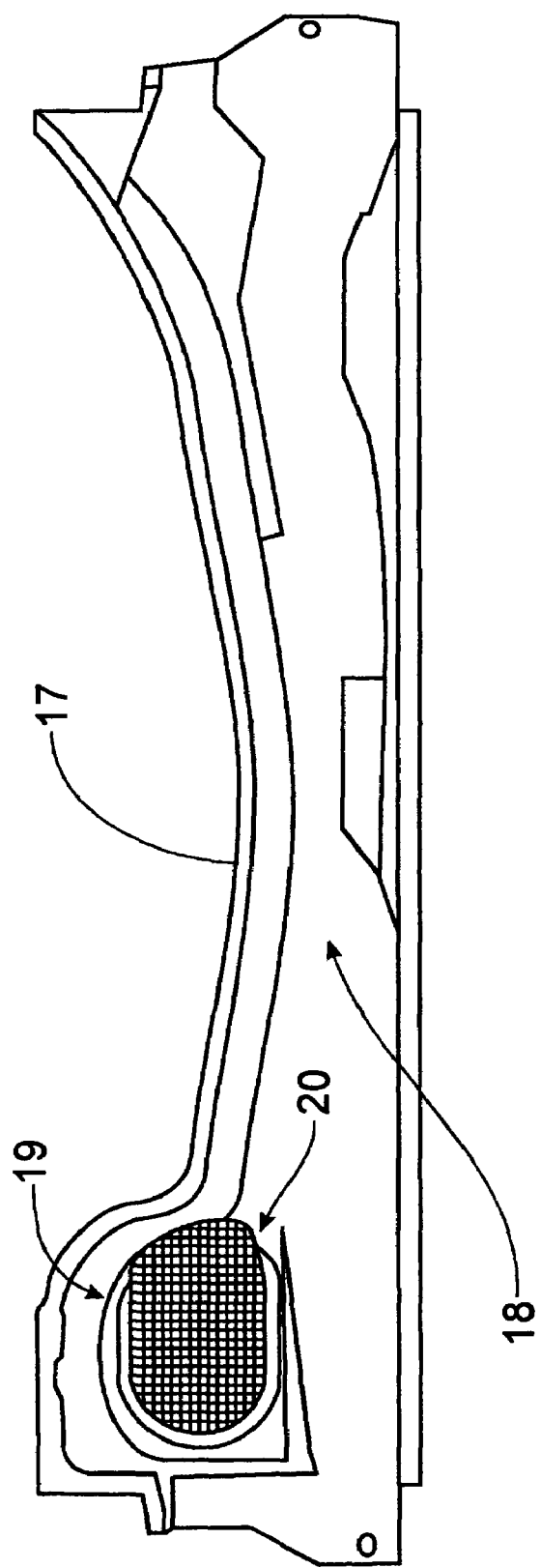
FIG. 3 is a top plan view of the fresh air intake cowling of a vehicle having the fresh air intake opening for the heating, ventilation and air conditioning system along the passenger side of the cowling.

Referring to FIGS. 1-3, an automotive vehicle 10 is provided with a rain-hat associated with the fresh air intake opening into the heating, ventilation and air conditioning system to block the flow of free water into the opening while allowing the flow of fresh air through the opening. The vehicle 10 is formed with a hood 12 located at a forward extremity of the vehicle 10 and a windshield 15 sloped upwardly and rearwardly from the hood 12 to join with the elevated roof structure 16. Between the hood 12 and the windshield 15 is the cowling 17 having the function of drawing fresh air into the heating, ventilation and air conditioning system (HVAC) 13 of the vehicle 10. The cowling 17 is best seen in FIG. 3 and forms a laterally extending channel 18 that terminates at the fresh air inlet opening 19 near the passenger side of the vehicle 10.

Figure 4:
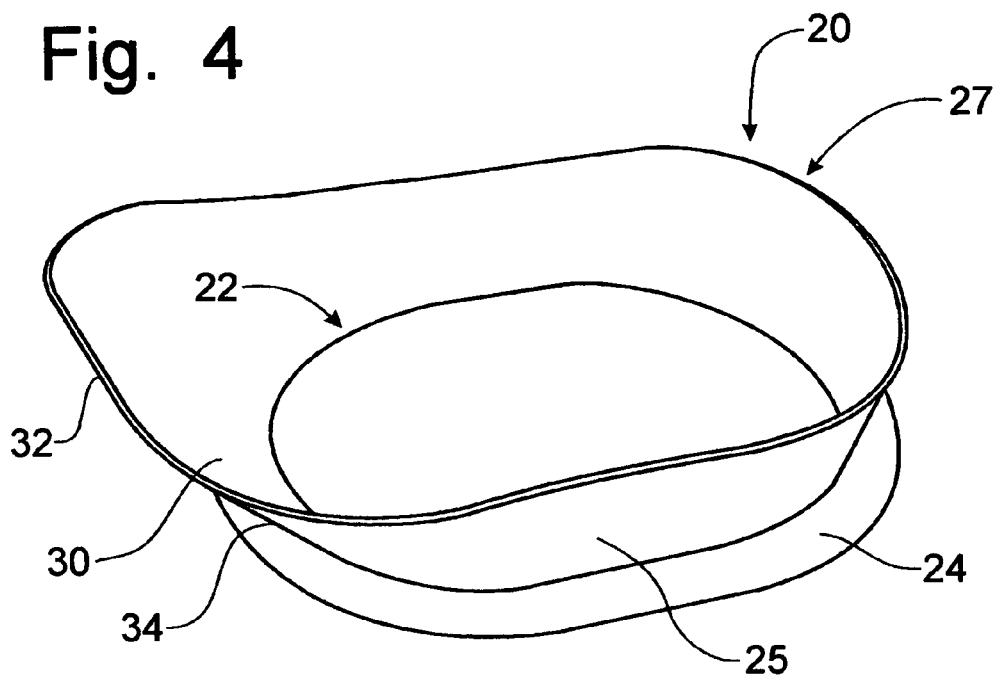
FIG. 4 is an enlarged perspective view of a first embodiment of the rain-hat incorporating the principles of the instant invention.
Figure 5:
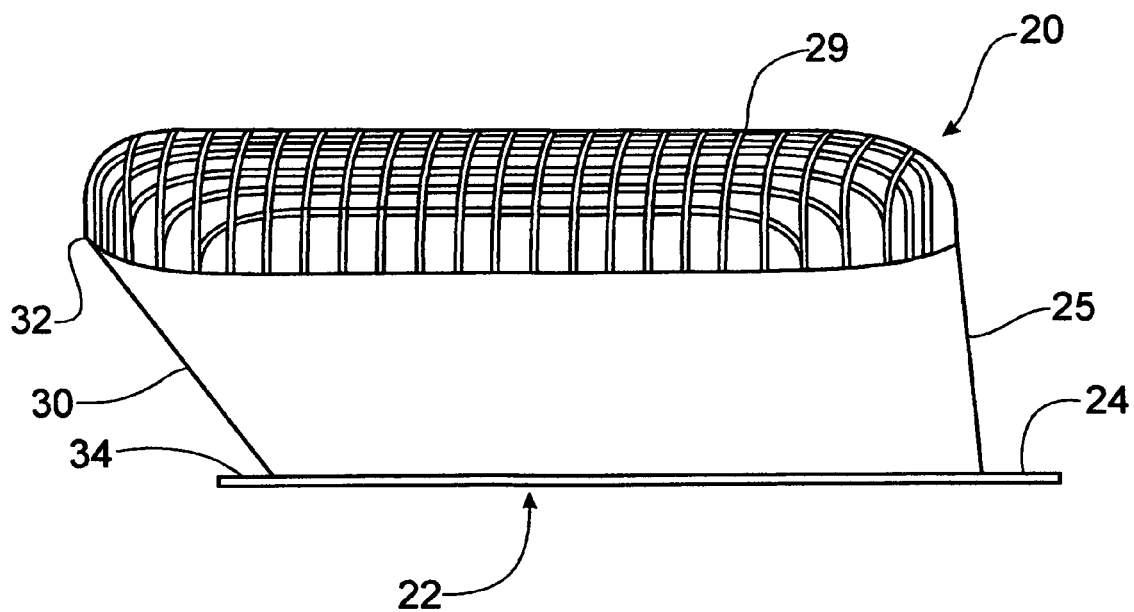
FIG. 5 is an enlarged side elevational view of the rain-hat depicted in FIG. 4.

The rain-hat 20 is best seen in FIGS. 4 and 5. The rain-hat 20 is preferably formed of plastic and is in the form defining a central opening 22 that is alignable with the fresh air inlet opening 19 in the cowling 17. The rain-hat 20 is formed with an annular base 24 that rests against the cowling 17 to be sealed against the cowling 17 by a sealant (not shown). An upright wall 25 is integrally formed with the annular base 24 to serve as a dam against the entry of rainwater into the fresh air inlet opening 19. As depicted in FIG. 5, the top of the upright wall 25 can be formed with cage apparatus 29 to provide additional protection for the ingestion of debris into the HVAC system 13 through the central opening 22 of the rain-hat 20.

As best seen in FIGS. 4 and 5, the upright wall 25 includes a front wall portion 30 that is oriented for engagement with the flow of fresh air being directed by the channel 18 formed in the cowling 17 toward the rain-hat 20. The front wall 30 is formed with the upper edge 32 leading into the flow of fresh air, as compared to the corresponding portion 34 of the base 24 at the bottom of the front wall 30. Thus, the front wall 30 is sloped from the bottom base portion 34 toward the upper edge 32 into the direction of the airflow along the channel 18. The sloped front wall 30 along with the remaining portions of the upright wall define an upper opening 27 that is larger in area due to the leading front wall upper edge than the central opening 22 defined by the base member 24. The remaining portions of the upright wall 25, other than the front wall 30, are preferably generally vertical with respect to the base member 24.

Figure 7:
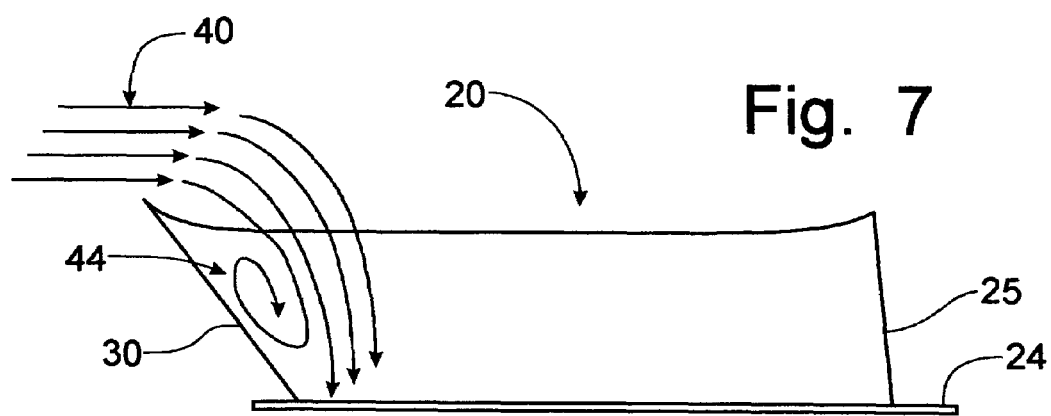
FIG. 7 is a schematic representation of the air flow intake for the first embodiment of the rain-hat depicted in FIGS. 5 and 6.
Figure 8:
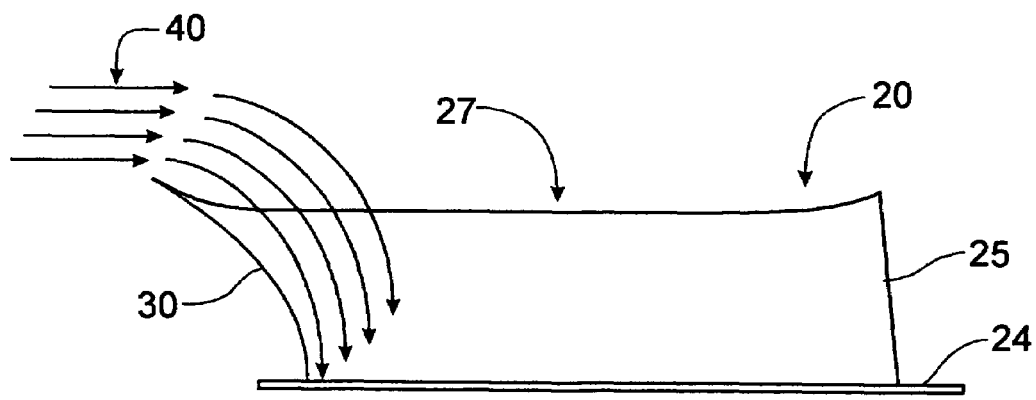
FIG. 8 is a schematic representation of the air flow into a second embodiment of the rain-hat formed according to the principles of the instant invention.

The front wall 30 can be formed in a linear configuration, as is depicted in FIGS. 4, 5 and 7, or preferably in a curvilinear configuration, as is depicted in FIG. 8. The sloped front wall 30 will serve to reduce the pressure loss associated with the inlet of fresh air over the upright wall of a rain-hat in either configuration, although, as will be discussed in greater detail below, the curvilinear configuration would provide the greatest improvement.

Figure 6:
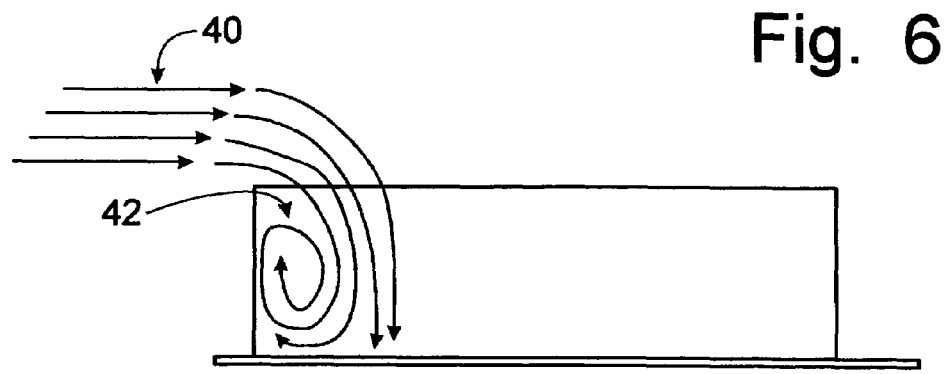
FIG. 6 is schematic representation of the separation region and recirculation flow created with the intake of air over a conventional prior art rain-hat configuration.

In FIGS. 6-8, the operation of the various rain-hat configurations is schematically represented with the flow of air being depicted by the arrows 40. In FIG. 6, the prior art rain-hat configuration having a generally vertical front wall creates a substantial flow separation 42 in the flow of air once the air passes over the top edge of the front wall. This flow separation 42 restricts the free movement of fresh air through the central opening of the rain-hat into the fresh air inlet opening of the vehicle's HVAC system 13, and causes the pressure drop forcing the HVAC system 13 to utilize additional power to intake the stream of fresh air. In FIG. 7, the linear front wall configuration of the rain-hat 20 is represented. The linear shape of the sloping front wall 30 still presents a slight impediment to the smooth flow of air over the leading front edge 32 toward the central opening 22, resulting in a slight flow separation 44. Since the flow separation 44 is substantially smaller and less obstructive than the flow separation 42 experienced with the prior art rain-hat configuration, the HVAC system 13 sees a substantial reduction in the power required to draw fresh air through the fresh air inlet opening.

The curvilinear configuration of the front wall 30, as represented in FIG. 8, provides a smooth flow path and presents the least disruption in the inflow of fresh air into the vehicle's HVAC system 13. The curved shape of the front wall 30 has an increasing slope gradient extending from the leading upper edge 32 toward the base member 34 to define a downwardly directed curved flow path for the smooth movement of fresh air over the leading upper edge 32 into the central opening 22 and through the fresh air inlet opening 19 of the HVAC system 13. In contrast, the linearly shaped front wall 30 has a substantially constant slope gradient from the leading upper edge 32 to the base member 34. The curved configuration of the front wall 30 can also be formed as a fifth order or B-spline curve with the curve slopes at the beginning and at the end being aligned with the desired flow directions.

Figure 9:
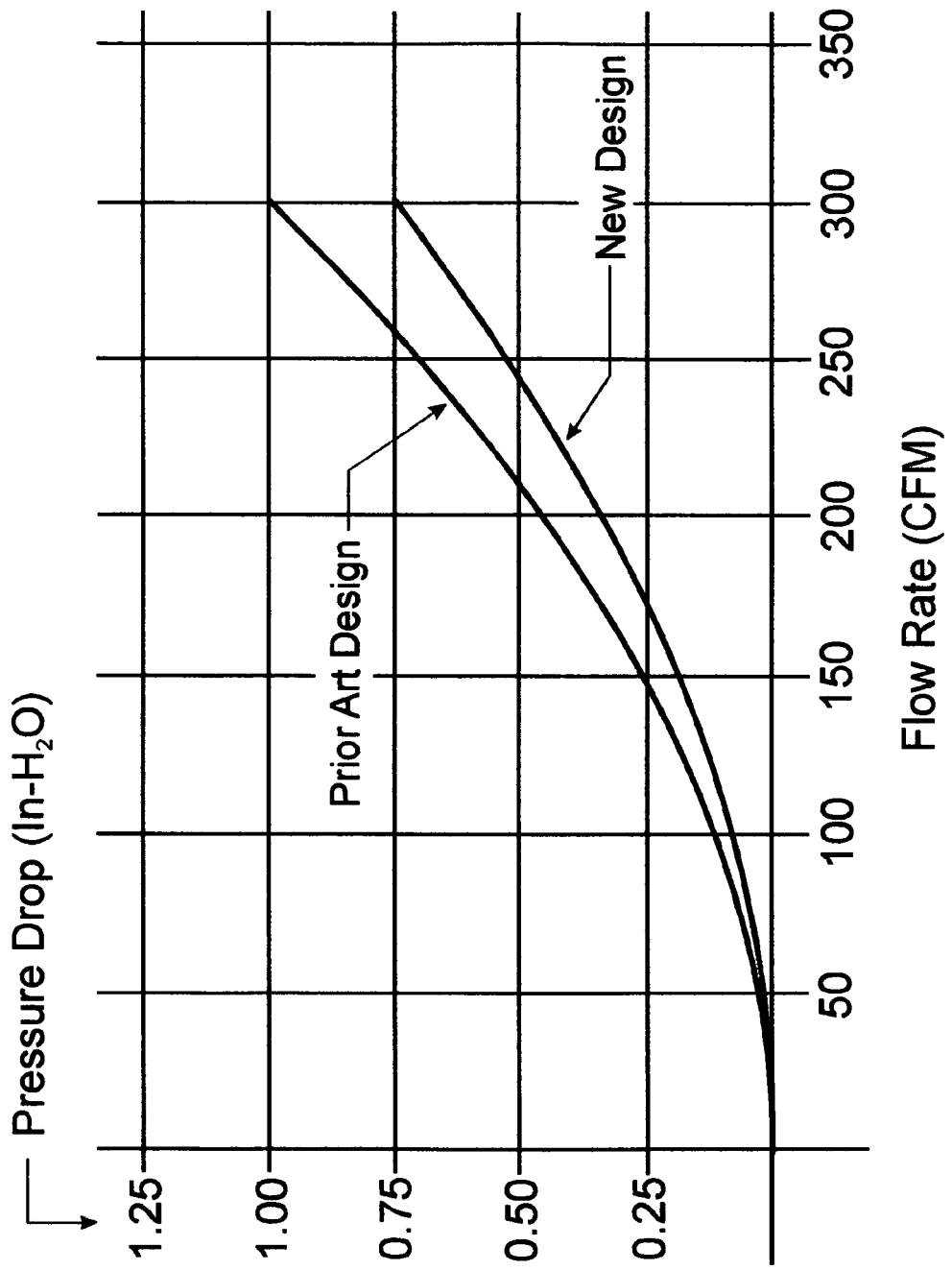
FIG. 9 is a graph depicting the improvement in pressure drop associated with the intake of fresh air into an HVAC system for a prior art rain-hat configuration and the rain-hat configuration formed according to the principles of the instant invention.

In both the linear and curvilinear configurations of the front wall 30 of the rain-hat 20, the upright wall 25 still provides a dam for the blocking of the flow of rainwater into the fresh air inlet opening 19 to the vehicle's HVAC system 13. The graph depicted in FIG. 9 shows the improvement in pressure loss, which corresponds directly to the power requirement for the intake of fresh air into the HVAC system 13, for the rain-hat 20 incorporating the principles of the instant invention, as compared to the prior art rain-hat design having a vertical front wall. At a flow rate of about 300 cubic feet per minute, the rain-hat designed with a sloped front wall 30 achieved approximately a 25% reduction in the pressure loss associated with the utilization of the respective rain-hats.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description, may be employed in other embodiments without departing from the scope of the invention.

Having thus described the invention, what is claimed is:

1. A rain-hat system for use on a vehicle having a fresh air inlet opening for the intake of fresh air along a flow path into a ventilation system supported on said vehicle, comprising:
    a vehicle rain hat mounted at the fresh air inlet opening, including:
        a base member defining a central opening aligned with said fresh air inlet opening; and
        an upright wall integrally formed with said base member to provide a barrier surrounding said central opening against the movement of rainwater into said fresh air inlet opening, said upright wall including a back wall portion and an opposing front wall portion over which said flow path extends to direct fresh air into said central opening, said front wall portion having a slope gradient that is less than a corresponding slope gradient of said back wall portion such that an upper edge of said upright wall defines an upper inlet opening that has a larger area than said central opening, said upright wall forming an integral barrier extending from said central opening to said upper inlet opening.

2. The rain-hat of claim 1 wherein said back wall portion is linear from said base member to said upper edge, said front wall portion being curved from said base member to said upper edge.

3. The rain-hat of claim 2 wherein said front wall portion has a decreasing slope gradient from said base member to said upper edge.

4. The rain-hat of claim 3 wherein said upright wall, except for said front wall portion, is oriented perpendicularly to said base member.

5. A rain-hat system for use on a vehicle having a fresh air inlet opening for the intake of fresh air along a flow path into a ventilation system supported on said vehicle, comprising:
    a vehicle rain hat mounted at the fresh air inlet opening, including:
        a base member defining a central opening aligned with said fresh air inlet opening; and
        an upright wall integrally formed with said base member to provide a barrier surrounding said central opening against the movement of rainwater into said fresh air inlet opening, said upright wall including a back wall portion and an opposing front wall portion over which said flow path extends to direct fresh air into said central opening, said front wall portion having a curved shape with a decreasing slope gradient from said base member toward an upper edge of said front wall portion such that said upright wall defines an upper opening that has a larger area than said central opening.

6. The rain-hat of claim 5 wherein said back wall portion is linear from said base member to said upper edge.

7. The rain-hat of claim 6 wherein said upright wall, except for said front wall portion, is oriented perpendicularly to said base member.

* * * * *